(12) United States Patent
Tully

(10) Patent No.: US 11,913,498 B2
(45) Date of Patent: Feb. 27, 2024

(54) PUMPING BEARING CAGE

(71) Applicant: AKTIEBOLAGET SKF, Gothenburg (SE)

(72) Inventor: James M Tully, Schwenksville, PA (US)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 17/676,941

(22) Filed: Feb. 22, 2022

(65) Prior Publication Data

US 2023/0265885 A1 Aug. 24, 2023

(51) Int. Cl.
*F16C 33/66* (2006.01)
*F16C 33/38* (2006.01)

(52) U.S. Cl.
CPC ...... *F16C 33/6681* (2013.01); *F16C 33/3887* (2013.01)

(58) Field of Classification Search
CPC .............. F16C 33/3806; F16C 33/3887; F16C 33/6651; F16C 33/6681
See application file for complete search history.

(56) References Cited

U.S. PATENT DOCUMENTS

| | | | | |
|---|---|---|---|---|
| 2,219,031 A | * | 10/1940 | Frauenthal | F16C 33/4605 384/572 |
| 2005/0041899 A1 | | 2/2005 | Ohata et al. | |
| 2006/0120646 A1 | * | 6/2006 | Suzuki | F16C 33/4623 384/470 |

FOREIGN PATENT DOCUMENTS

| | | | |
|---|---|---|---|
| CN | 201575067 U | 9/2010 | |
| CN | 209146168 U | 7/2019 | |
| GB | 719829 A | 12/1954 | |
| JP | 2005321047 A * | 11/2005 | .......... F16C 33/3843 |
| JP | 3934277 B2 | 6/2007 | |
| JP | 2011169370 A * | 9/2011 | .......... F16C 33/3806 |
| JP | 6191716 B2 | 9/2017 | |

OTHER PUBLICATIONS

Machine Translation of JP-2011169370-A (Year: 2011).*
Machine Translation of JP-2005321047-A (Year: 2005).*

* cited by examiner

*Primary Examiner* — Alan B Waits
(74) *Attorney, Agent, or Firm* — J-TEK LAW PLLC; Scott T. Wakeman; Mark A. Ussai

(57) ABSTRACT

A bearing cage includes an annular body disposeable between inner and outer rings and having first and second axial ends, inner and outer circumferential surfaces, and a plurality of pockets for retaining rolling elements. The cage includes at least one channel extending axially through the annular body and having a first opening at the first axial end and a second opening at the second axial end. The channel(s) are each configured to direct liquid to flow axially through the bearing when the cage rotates about the centerline. Alternatively or additionally, the cage includes at least one elongated projection extending radially inwardly from the inner circumferential surface or radially outwardly from the outer circumferential surface and extending axially between the first axial end and the second axial end. The projection(s) are each configured to direct liquid to flow axially through the bearing when the cage rotates about the centerline.

12 Claims, 11 Drawing Sheets

PUMPING BEARING CAGE

BACKGROUND OF THE INVENTION

The present invention relates to bearings, and more particularly to cages for retaining the rolling elements of bearings.

Rolling element bearings are well known and basically include an inner ring, an outer ring disposed about the inner ring and a plurality of rolling elements disposed between and rotatably coupling the inner and outer rings. In order to maintain a desired spacing between adjacent rolling elements, bearings are often provided with a cage for retaining the rolling elements. Such cages typically include an annular body with a plurality of pockets spaced circumferentially about a centerline, each pocket being configured to retain one of the rolling elements.

SUMMARY OF THE INVENTION

The present invention is a cage for a bearing, the bearing including an inner ring, an outer ring and a plurality of rolling elements. The bearing cage comprises an annular body disposeable between the inner ring and the outer ring and having a centerline, first and second axial ends spaced apart along the centerline, an inner circumferential surface and an outer circumferential surface. A plurality of pockets extend radially between the inner circumferential surface and the outer circumferential surface and are spaced circumferentially about the centerline, each pocket being configured to retain a separate one of the plurality of rolling elements. Further, the cage has at least one channel extending axially through the annular body and has a first opening at the first axial end and a second opening at the second axial end, the at least one channel being configured to direct liquid to flow axially through the bearing when the cage rotates about the centerline. Alternatively or additionally, the cage has at least one elongated projection extending radially inwardly from the inner circumferential surface or radially outwardly the outer circumferential surface and extending axially between the first axial end and the second axial end. The at least one projection is configured to direct liquid to flow axially through the bearing when the cage rotates about the centerline.

Further, when the cage includes one or more channels, each channel is preferably an "open" groove extending radially inwardly from the inner circumferential surface of the annular body. Alternatively, the channels may be open grooves extending inwardly from the annular body outer circumferential surface or enclosed channels extending axially between the first and second axial ends and disposed radially between the body inner and outer circumferential surfaces.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Figure 1:
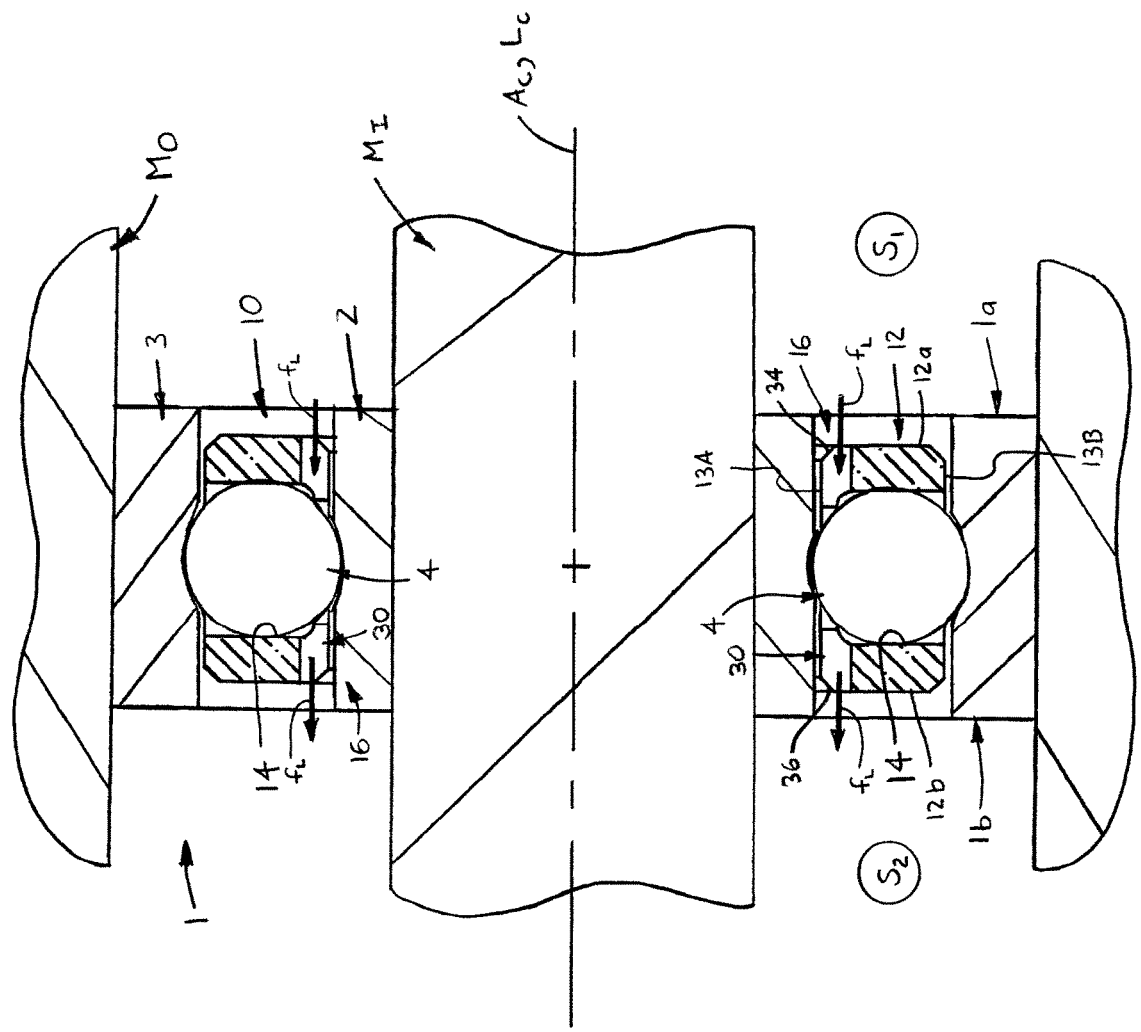
FIG. 1 is an axial cross-sectional view of a bearing having a cage in accordance with a first, presently preferred construction, shown mounted about an inner member and within an outer member.
Figure 2:
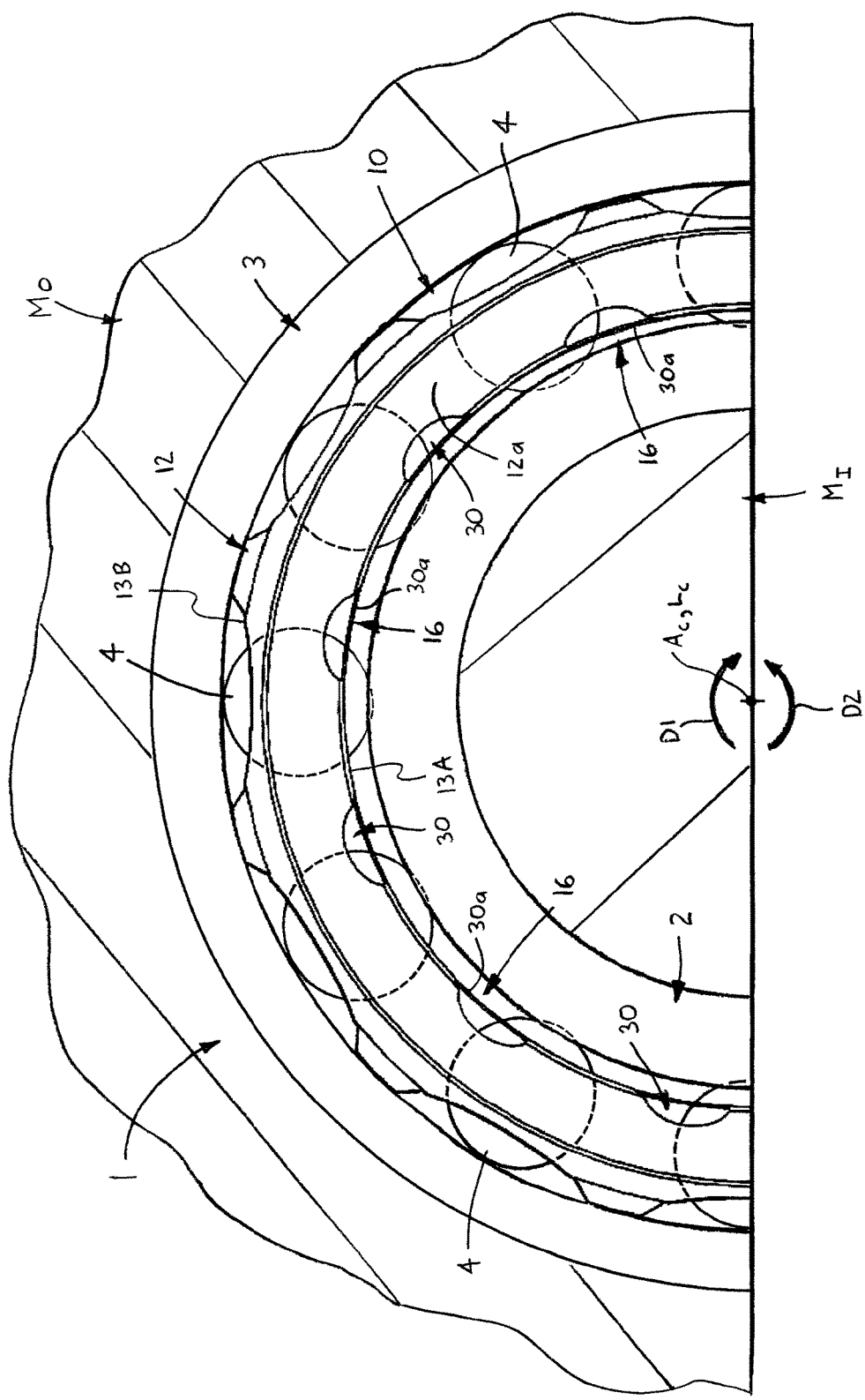
FIG. 2 is a broken-away, end view of an upper portion of the bearing of FIG. 1.

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Further, as used herein, the words "connected" and "coupled" are each intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-13 a cage 10 for a rolling element bearing 1, the bearing 1 including an inner ring 2, an outer ring 3 and a plurality of rolling elements 4. The bearing 1 has opposing first and second axial sides 1a, 1b, respectively, and is configured to rotatably couple an inner member $M_I$, such as a shaft, a sleeve, an annular rotor, etc., with an outer member $M_O$, for example a housing, a rotatable hub, a stator, etc. Specifically, the inner ring 2 is coupled with the inner member $M_I$ and the outer ring 3 is coupled with the outer member $M_O$, and either the inner member $M_I$ and the coupled inner ring 2, or the outer member $M_O$ and the coupled outer ring 3, are rotatable about a central axis $A_C$. Basically, the bearing cage 10 comprises an annular body 12 with a plurality of pockets 14 for retaining the rolling elements 4 and at least one channel 16, or at least one elongated projection 18, for directing liquid to flow through the bearing 1, the liquid preferably being a lubricant but may alternatively be any other appropriate liquid (e.g., liquid freon).

More specifically, the annular body 12 is disposeable between the inner ring 2 and the outer ring 3 and has a centerline $L_C$, which is coaxial with the central axis $A_C$, first and second axial ends 12a, 12b, respectively, spaced apart along the centerline $L_C$, an inner circumferential surface 13A and an outer circumferential surface 13B. The plurality of pockets 14 each extend radially between the body inner circumferential surface 13A and the body outer circumferential surface 13B and are spaced circumferentially about the centerline $L_C$. Each pocket 14 is configured to retain a separate one of the plurality of rolling elements 4 and is preferably defined or bounded by a partially spherical inner surface 15 adapted to retain a "ball" rolling element 4. However, the pockets 14 may be defined by two or more flat or curved surfaces to provide a pocket 14 configured to retain a rolling element 4 of any other appropriate shape, such as for example, a cylindrical roller, a tapered roller, a needle roller, a barrel roller, etc.

Figure 3:
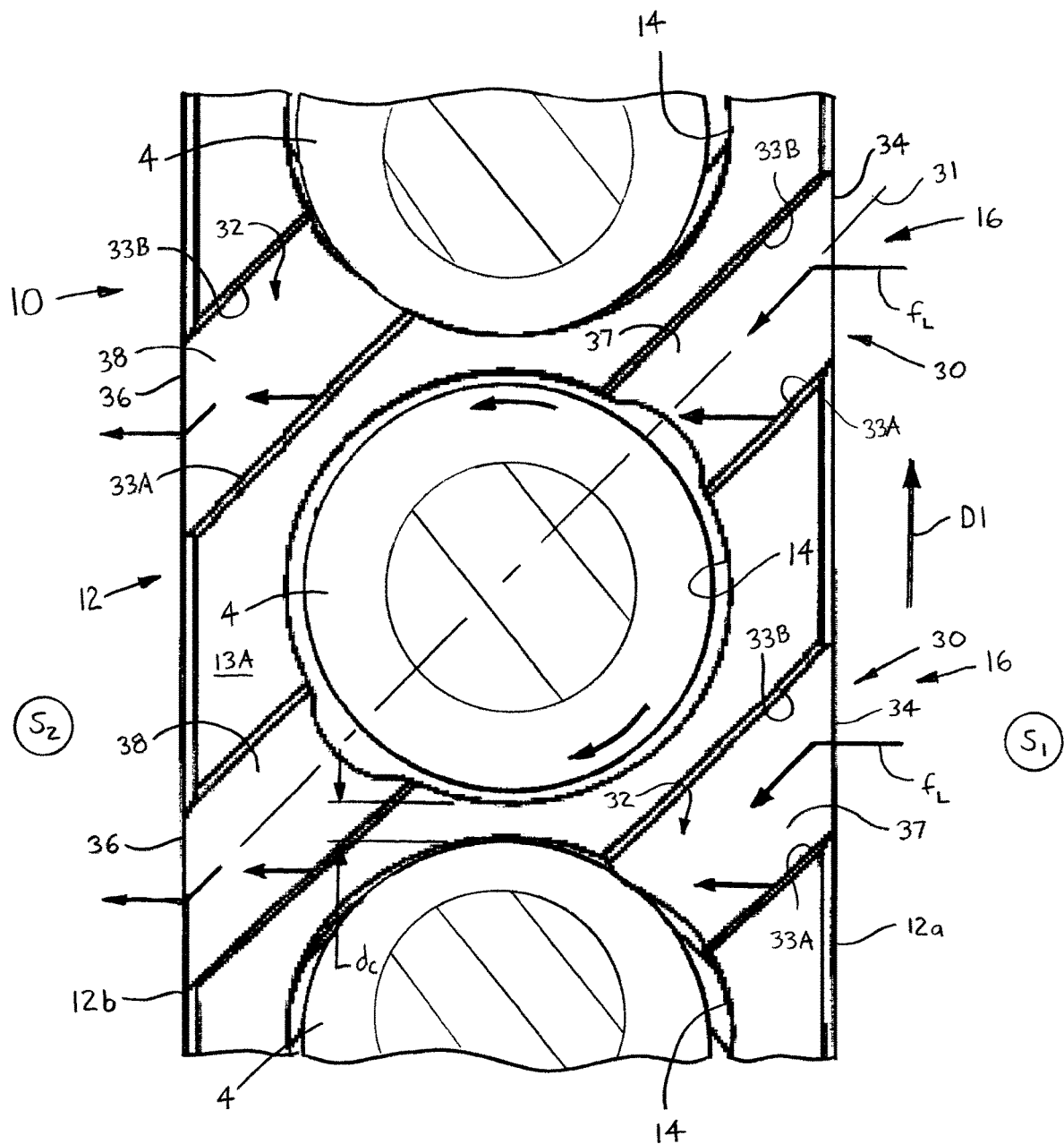
FIG. 3 is a broken-away, inside side view of the first construction cage with rolling elements.
Figure 4:
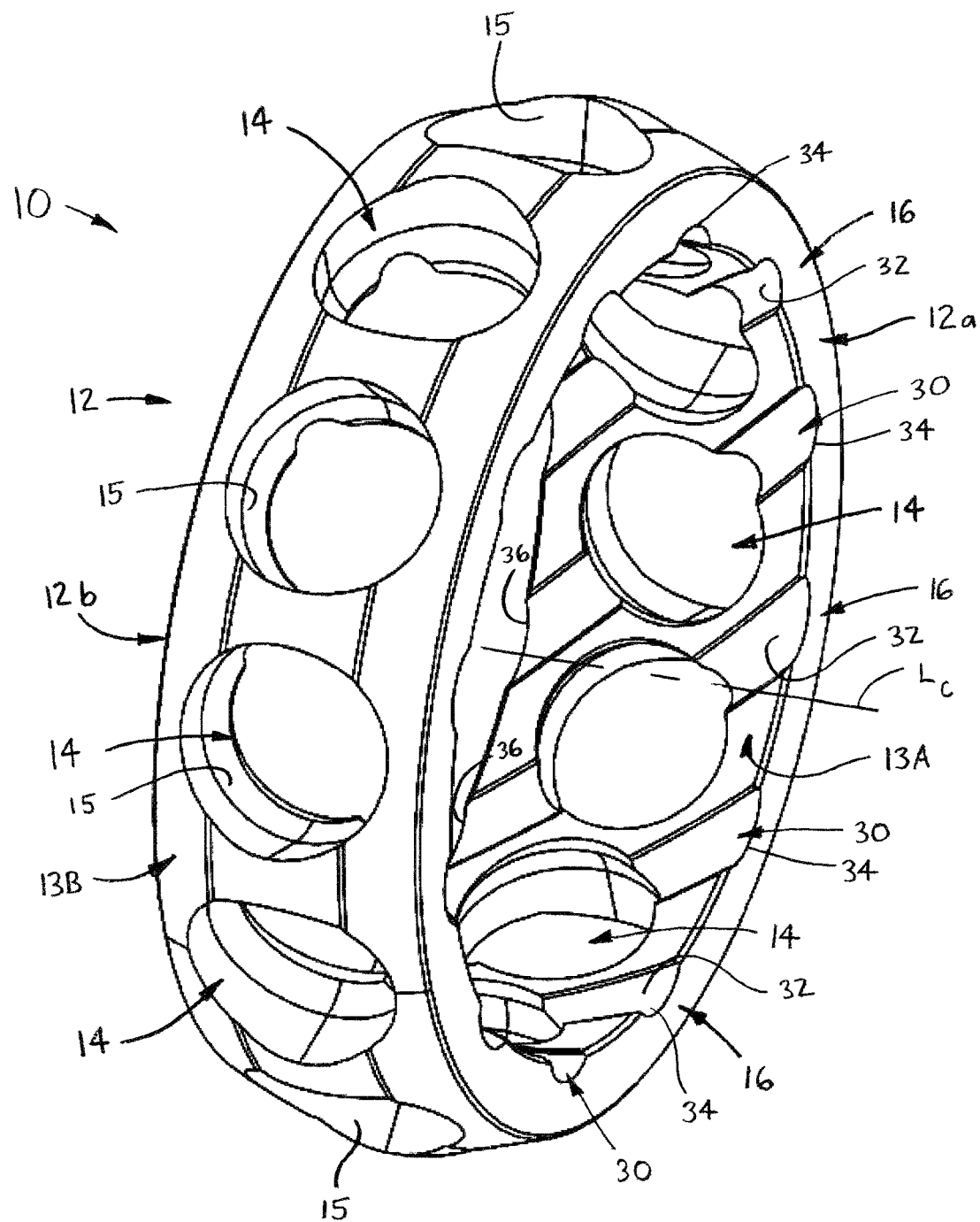
FIG. 4 is a perspective view of the first construction cage.
Figure 5:
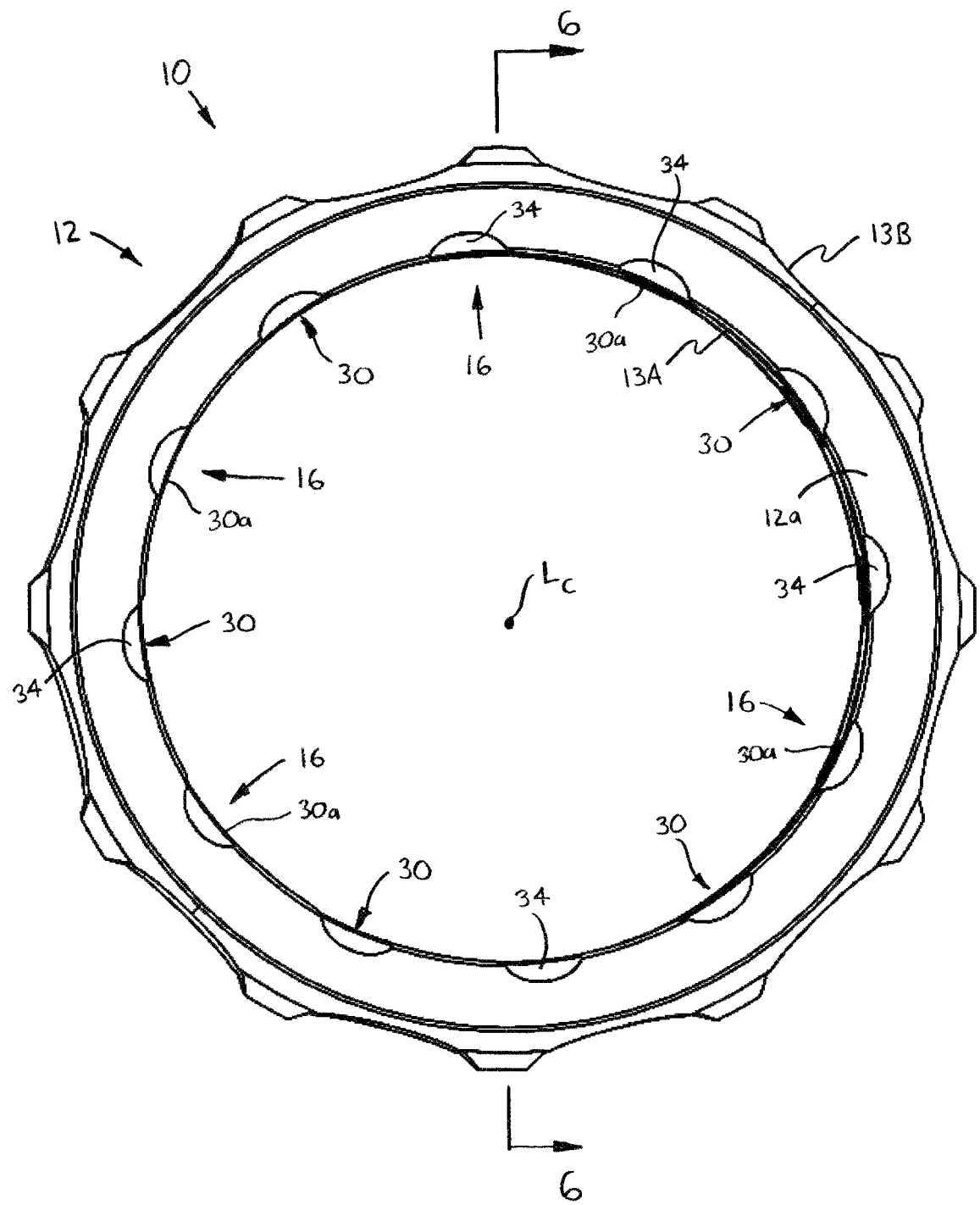
FIG. 5 is an end view of the first construction cage.
Figure 12:
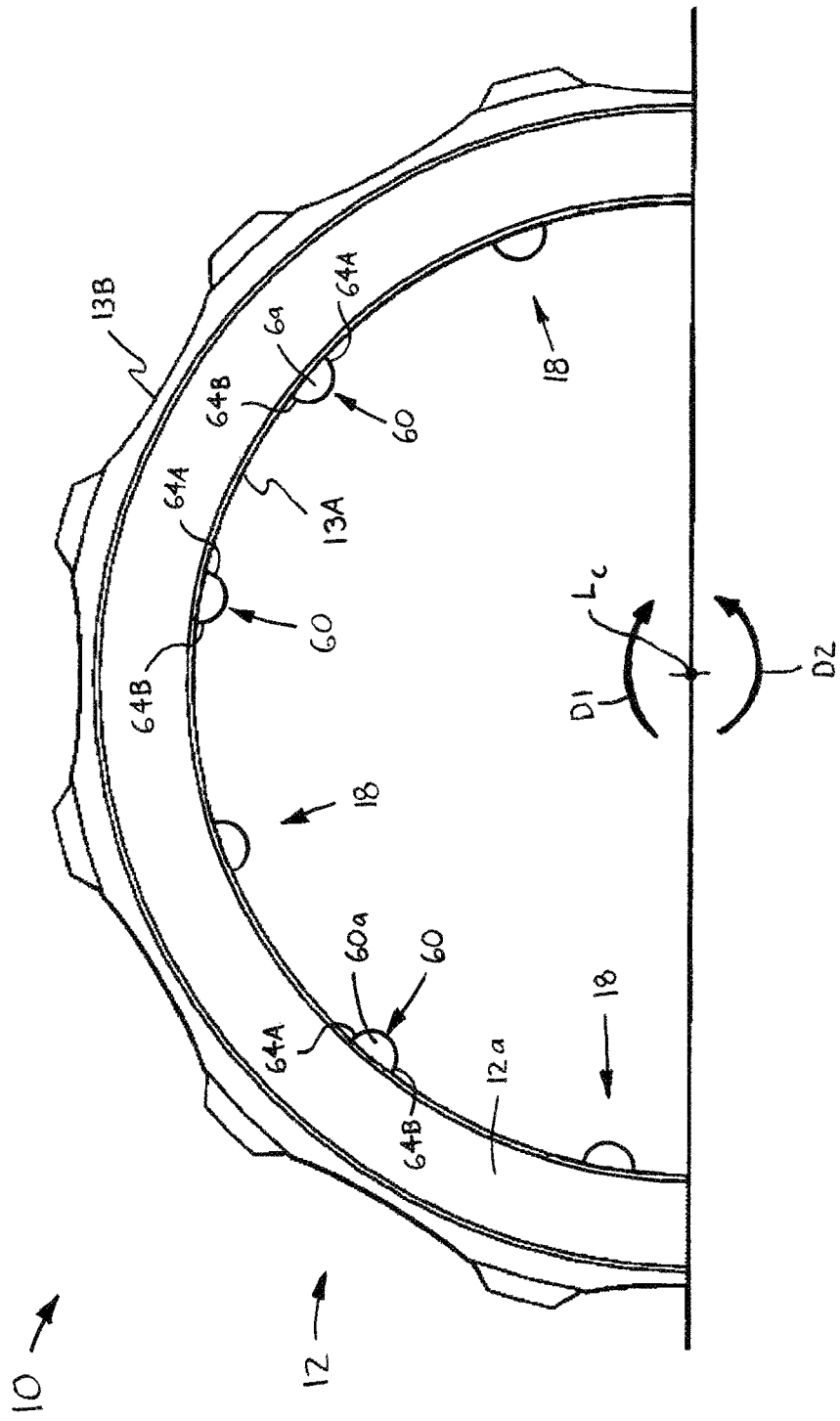
FIG. 12 is an end view of an upper portion of a cage in accordance with a fourth construction, in which the cage has projections.
Figure 13:
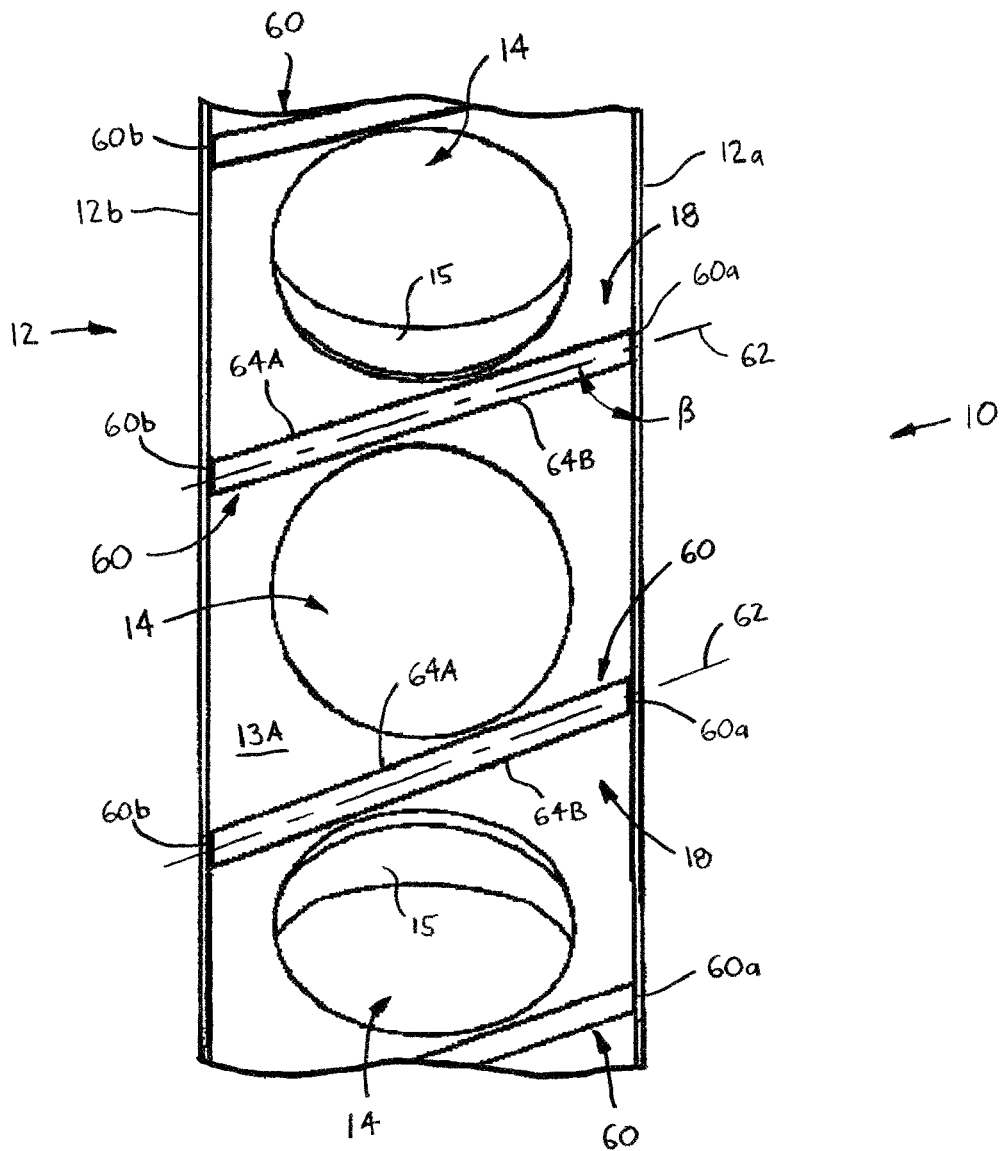
FIG. 13 is a broken-away inside side view of the fourth construction cage.

In a presently preferred application, the annular body 12 has a plurality of the channels 16 spaced circumferentially about the centerline $L_C$, each channel 16 extending axially through the body 12 and having a first opening 20, preferably an inlet, at the first axial end 12a of the annular body 12 and a second opening 22, preferably an outlet, at the second axial end 12b of the annular body 12, as depicted in FIGS. 1-11. Alternatively, the annular body 12 has a plurality of the elongated projections 18 extending radially inwardly from the body inner circumferential surface 13A, or radially outwardly from the body outer circumferential surface 13B, and extending axially between the body first and second axial ends 12a, 12b, as shown in FIGS. 12 and 13. In either case, each channel 16 or each projection 18 is configured to direct liquid to flow axially through the bearing 1 when the cage 10 rotates about the centerline $L_C$. As such, the plurality of channels 16 or projections 18 are each preferably configured to pump at least a portion of a quantity of lubricant disposed within either a first space S1 adjacent to a first axial side 1a of the bearing 1, or within a second space S2 adjacent to a second axial side 1b of the bearing 1, into the other space S2, S1, respectively, as indicated in FIGS. 1 and 3 and discussed in further detail below.

Referring to FIGS. 1-7, in a first preferred construction, each channel 16 is preferably formed as an open groove 30 extending radially outwardly from the inner circumferential surface 13A of the annular body 12, which is bounded by an elongated curved surface 32 extending both radially outwardly from the body inner surface 13A and axially between the first and second axial ends 12a, 12b of the annular body 12. Each groove 30 has a first opening 34 located at the body first axial end 12a and a second opening 36 located at the body second axial end 12b. Preferably, the curved surface 32 is formed such that each one of the plurality of grooves 30 has axial cross-sections with a semioval shape, but may be semicircular, rectangular or any other appropriate shape. Further, each one of the plurality of grooves 30 is preferably "angled" and extends both axially and circumferentially between the body first and second axial ends 12a, 12b.

More specifically, each one of the plurality of grooves 30 has a centerline 31 extending between the groove first opening 34 and the groove second opening 36. The groove centerline 31 defines an acute angle α (FIG. 6) with respect to the first axial end 12a of the annular body 12, i.e., with respect to a plane containing the first axial end of the cage body 12, as well with respect to the second axial end 12b. Preferably, the acute angle α has a value within the range of forty-five degrees)(45°) and sixty degrees (60°), but may have value less than forty-five degrees (45°) or greater than sixty degrees (60°) depending on the size of the annular body 12 and the space available between each pair of adjacent pockets 14. Due to the angled arrangement, the curved surface 32 of each groove 30 has a pair of facing, first and second deflector surface sections 33A, 33B, the first deflector surface section 33A facing partially toward the second axial end 12b of the annular body 12 and the second deflector surface section 33B facing partially toward the body first axial end 12a.

In a presently preferred application, the cage 10 and the rotatable one of the inner and outer rings 2, 3 rotates in a first angular direction $D_1$ about the central axis $A_c$, and thus also about the cage centerline $L_C$, with the cage 10 being intended to pump liquid (preferably lubricant) from a first space $S_1$ adjacent to the first axial side 1a of the bearing 1 into a second space $S_2$ adjacent to the second axial side of the bearing 1. As the cage 10 rotates in the first angular direction D1, liquid/lubricant within each groove 30 contacts the first deflector surface section 33A and is directed or pushed axially toward the second opening 36 of the groove 30 in a manner similar to a "snowplow", as indicated in FIG. 3. Such direction/pushing of liquid or lubricant out of the groove 30 through the groove second opening 36 creates a suction of additional liquid/lubricant into the groove first opening 34, causing a steady flow of liquid through each groove 30.

Further, with the preferred channels 16 being grooves 32 or "open channels", each one of the plurality of grooves 30 has an open radial end 30a (FIG. 2) at the inner circumferential surface 13A of the annular body 12. As such, each groove 30 is configured to entrain and direct lubricant disposed between the cage 10 and the inner ring 2 to flow outwardly from the second axial end 12b of the cage annular body 12, i.e., the flow of liquid within the adjacent open groove 30 entrains liquid between the cage 10 and the ring 2. Thus, the preferred grooves 30 pump liquid through the cage 10 by a combination of pushing/snowplowing liquid within the groove 30, suction of additional liquid into the groove 30, and entraining adjacent liquid between the cage 10 and the inner ring 2.

Furthermore, particularly with angled channels 16 formed generally "symmetrical" or having an acute angle α of forty-five degrees, when the cage 10 rotates in a second, opposing angular direction D2, liquid contacting the second deflector surface section 33B of the groove 30 is directed axially toward the first opening 34 of the groove 30. Thereby, the plurality of channels/grooves 30 are each also configured to pump at least a portion of a quantity of lubricant disposed within the second space $S_2$ adjacent to a second axial side 1b of the bearing 1 into a first space $S_1$ adjacent to the first axial side 1a of the bearing 1 when the cage rotates in the second direction D2.

Figure 6:
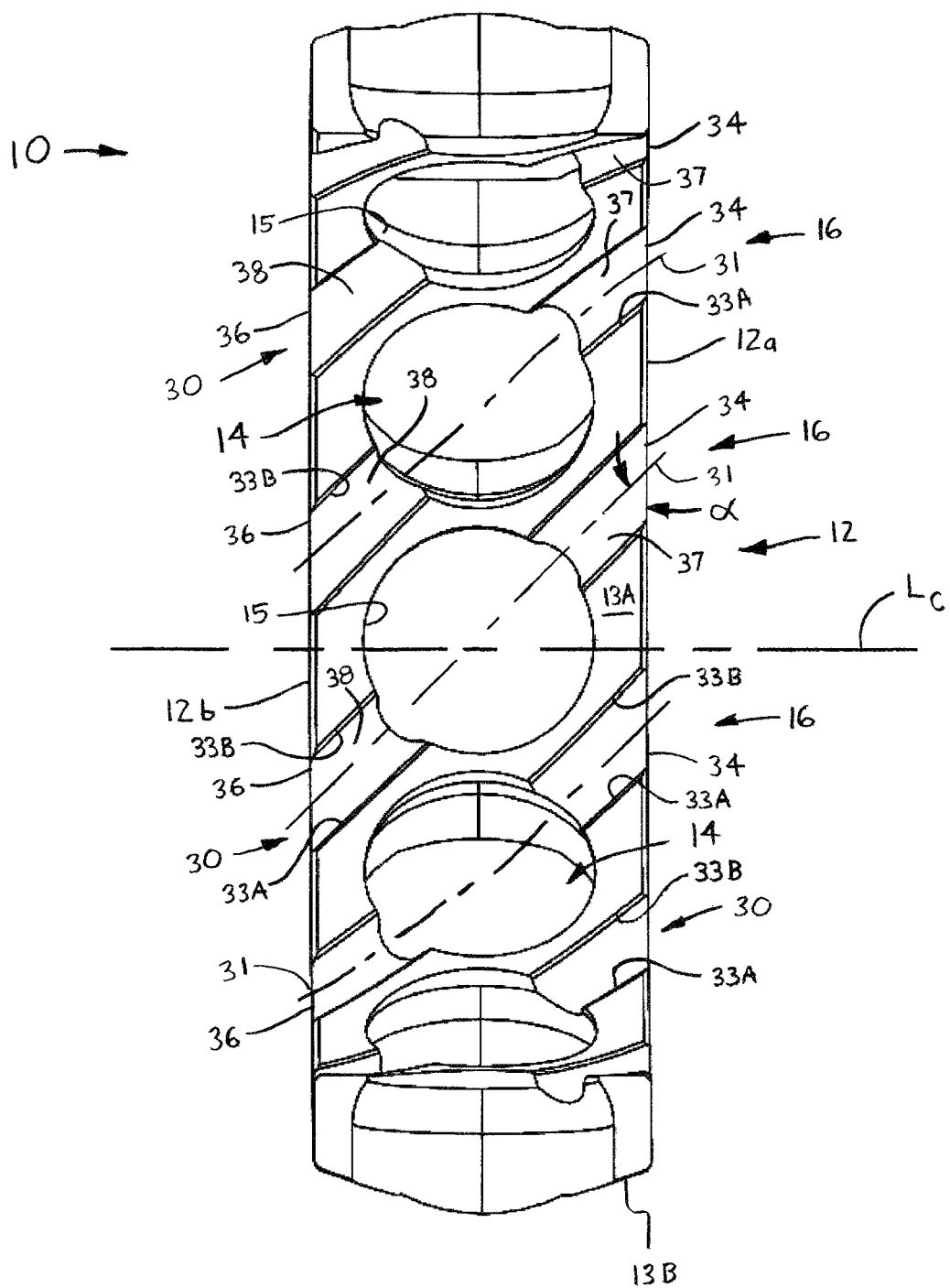
FIG. 6 is view through line 6-6 of FIG. 5.
Figure 7:
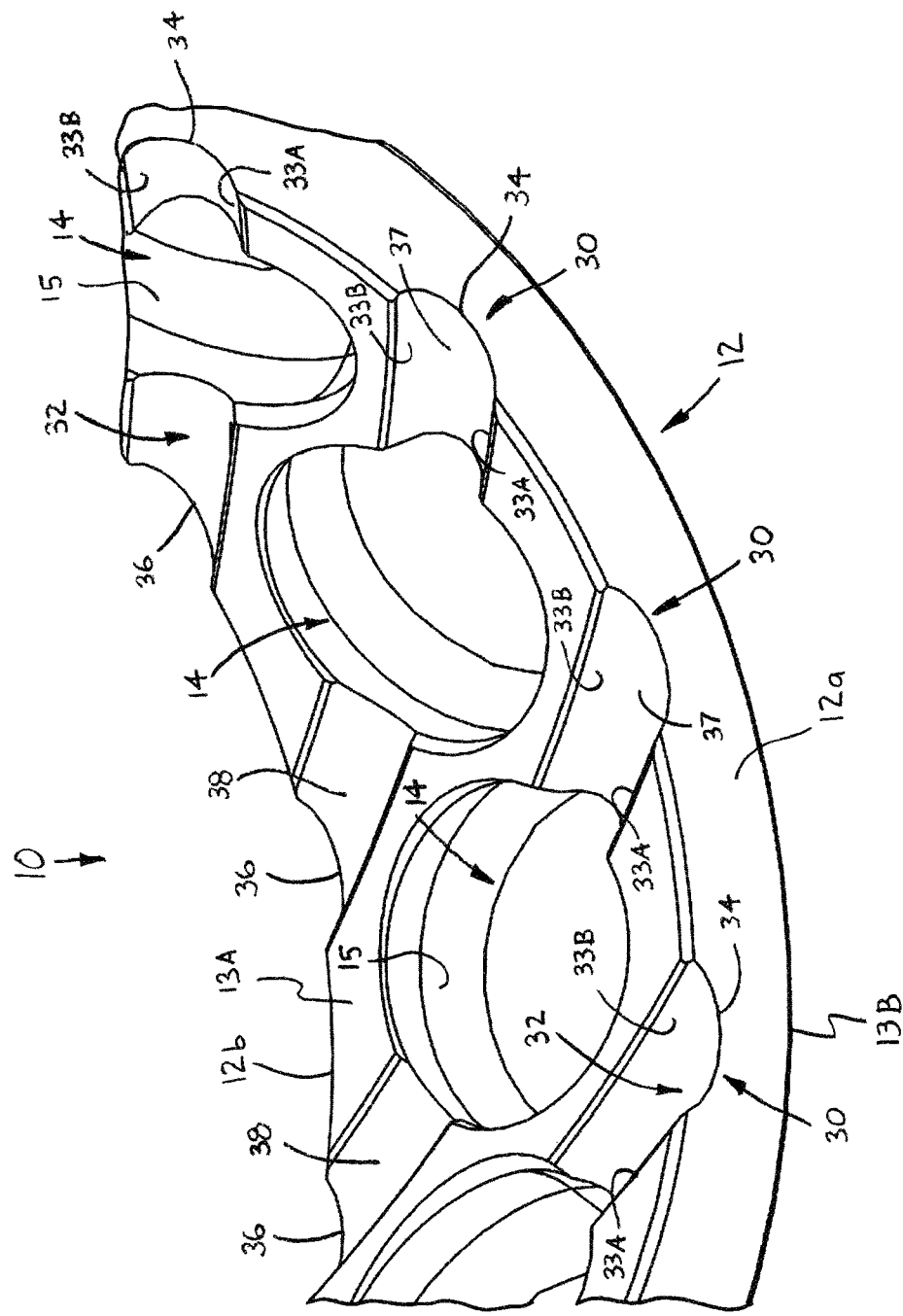
FIG. 7 is a broken-away, perspective view taken from the inside of the first construction cage.

Referring to FIGS. 3, 6 and 7, in the presently preferred application in which the circumferential distance $d_c$ (FIG. 3) between adjacent pockets 14 is limited or minimal, each groove 30 preferably extends through one of the pockets 14. Specifically, each groove 30 preferably has a first section 37 extending from the first axial end 12a of the annular body 12 to a separate one of the plurality of pockets 14 and a second axial section 38 extending from the one pocket 14 to the body second axial end 12b. As such, when the cage 20 rotates in the first direction D1, each one of the plurality of grooves 30 is configured such that liquid flow $f_L$ entering the first opening 34 of the groove 30 traverses the first section 37 of the groove 30 and passes around a rolling element 4 disposed within the one pocket 14 fluidly connected with the groove first section 36. Thereafter, the liquid flow $f_L$ enters the second section 38 of the groove 30 and exits the groove 30 through the groove second opening 36.

Alternatively, when there is a sufficient circumferential spacing distance $d_C$ between adjacent pockets 14, each one of the plurality of grooves 30 may extend between a separate one of a plurality of pairs of adjacent pockets 14 (structure not shown). As such, the entire passage 30 is continuous between the first and second openings 34, 36, i.e., not formed of two sections fluidly connected with one pocket 14.

Figure 8:
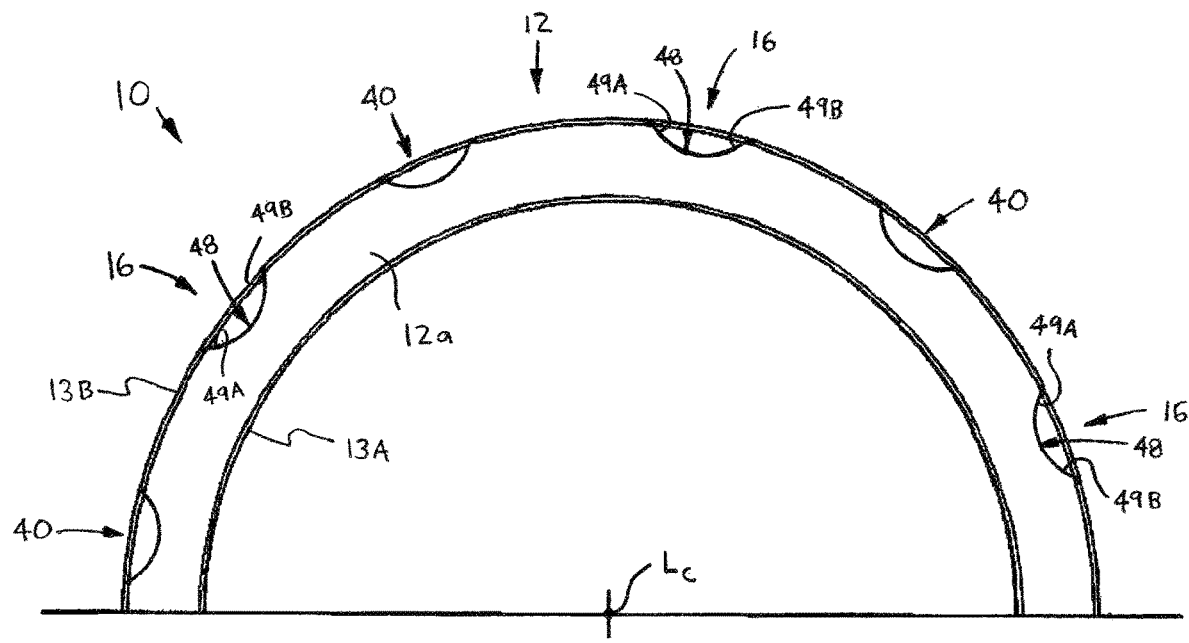
FIG. 8 is an end view of an upper portion of a cage in accordance with a second construction, in which the cage has open outer grooves.
Figure 9:
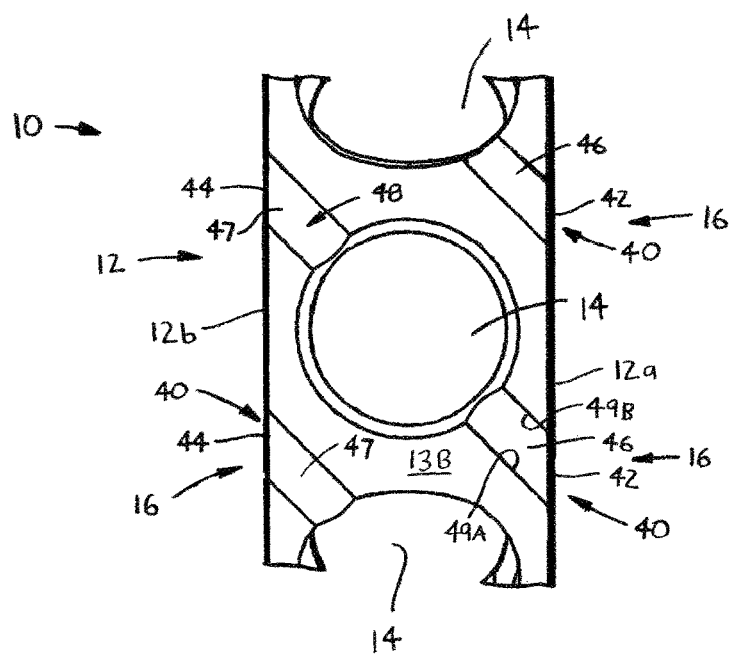
FIG. 9 is a broken-away outside side view of the second construction cage.

Referring to FIGS. 8 and 9, although preferably formed in the body inner surface 13A as described above, in a second construction, each channel 16 is alternatively formed as an open outer groove 40 each extending radially inwardly from the outer circumferential surface 13B and be spaced circumferentially about the centerline $L_C$. Such "outer" grooves 40 may be formed in the annular body 12 either alone or in combination with the "inner" grooves 30 formed in the inner surface 13A. In any case, the open outer grooves 40 each include a first opening 42 at the body first axial end 12*a* and a second opening 44 at the body second axial end 12*b*, and preferably includes a first section 46 extending between the body first end 12*a* and a separate one of the pockets 14 and a second section 47 extending between the body second end 12B and the one pocket 14. Further, each outer groove 40 has a curved inner surface 48 with facing deflector surface sections 49A, 49B which are formed and function generally identically as discussed above with the inner grooves 30.

Figure 10:
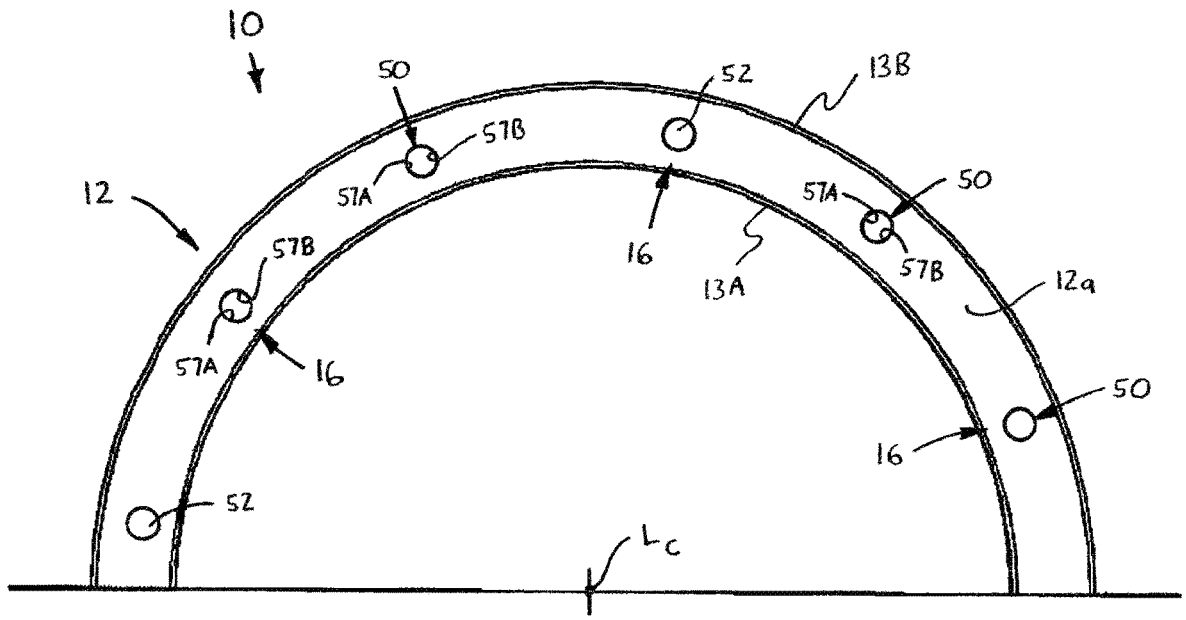
FIG. 10 is an end view of an upper portion of a cage in accordance with a third construction, in which the cage has enclosed channels.
Figure 11:
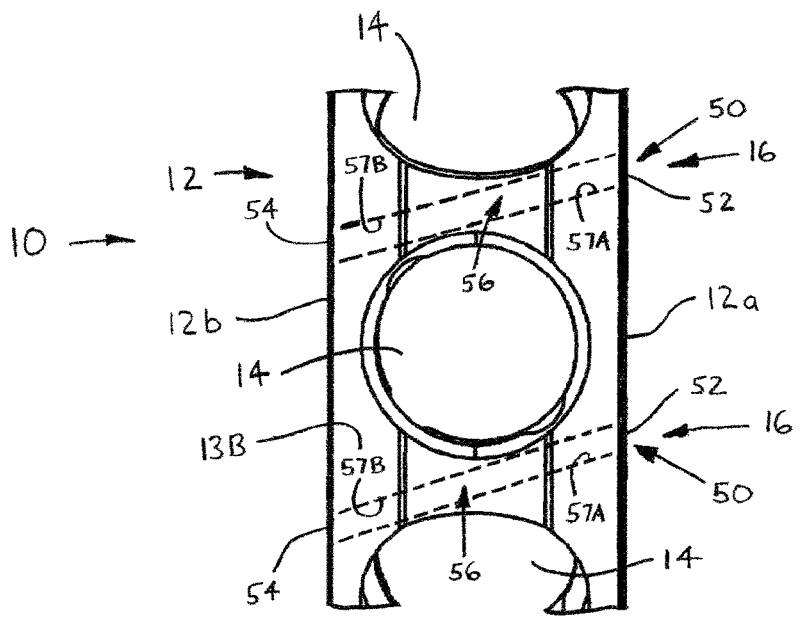
FIG. 11 is a broken-away outside side view of the third construction cage.

Referring to FIGS. 10 and 11, in a third construction, the plurality of channels 16 may be formed as enclosed channels 50 each extending through the annular body 12 between the first and second axial ends 12*a*, 12*b* and disposed radially between the inner and outer circumferential surfaces 13A, 13B. Each enclosed channel 50 may extend as a continuous channel 16 extending completely through the body 12 between a pair of adjacent pockets 14 and having a first opening 52 at the body first axial end 12*a* and a second opening 54 at the body second axial end 12*b*, as depicted in FIG. 11. Alternatively, each enclosed channel 50 may be formed as two sections each extending from one body axial end 12*a*, 12*b* and into a separate one of the pockets 14 (structure not shown). Further, each enclosed channel 50 may be defined or bounded by a circular cylindrical surface 56 having facing deflector surface sections 57A, 57B each functioning to direct fluid toward one opening 54, 52, respectively, depending on the rotation direction D1 or D2 of the cage 12.

Referring now to FIGS. 12 and 13, as discussed above, in a fourth construction, the cage 10 is provided with a plurality of elongated projections 18, either alternative to or in addition to the open grooves 30, 40 or enclosed channels 50. As with the channels 16, each projection 18 is configured to direct lubricant to flow axially through the bearing 1 when the cage 10 rotates about the cage centerline $L_C$. That is, the plurality of projections 18 are each configured to pump at least a portion of a quantity of lubricant disposed within the first space S1 adjacent to the first axial side 12*a* of the bearing 1 into the second space S2 adjacent to the second axial side 12*b* of the bearing 1 when the cage 10 rotates in the first angular direction D1 about the centerline $L_C$. Alternatively, the projections 18 pump at least a portion of the liquid in the second space S2 into the first space S1 when the cage 10 rotates in the second angular direction D2 about the centerline $L_C$.

Specifically, each projection 18 extends radially inwardly from the body inner circumferential surface 13A (as shown), or radially outwardly from the body outer circumferential surface 13B (not shown), and axially between the body first and second axial ends 12*a*, 12*b*. Each projection 18 is formed as ridge or rib 60 extending axially across the inner surface 13A or outer surface 13B and has a first end 60*a* at the first axial end 12*a* of the annular body 12, a second end 60*b* at the body second axial end 12*b*, and a centerline 62 extending between the two ends 60*a*, 60*b*. The projections 18 may each extend across the entire axial width of the annular body 12 or may be formed to extend only across a substantial portion of the body axial width, such that one or both ends 60*a*, 60*b* are spaced inwardly from the proximal body end 12*a*, 12*b*, respectively. Preferably, each one of the plurality of elongated projections 18 extends between a separate one of a plurality of pairs of adjacent pockets 14, but may be formed in two separate sections that each extend between one body end 12*a*, 12*b* and a separate one of the pockets 14 (alternative structure not shown).

Further, each one of the plurality of elongated projections 18 preferably extends both axially and circumferentially between the first axial end 12*a* of the annular body 12 and the second axial end 12*b* of the annular body 12. Specifically, the centerline 62 of each projection 18 defines an acute angle β (FIG. 13) with respect to the first axial end 12*a* of the cage annular body 12, which preferably has a value within the range of forty-five degrees)(45°) and sixty degrees)(60°), but may have value less than forty-five degrees)(45°) or greater than sixty degrees) (60°) depending on the size of the annular body 12 and the space available between each pair of adjacent pockets 14. Further, each one of the plurality of elongated projections 18 has first and second deflector surface sections 64A, 64B on opposing sides of the rib 60. The first deflector surface section 64A faces partially toward the second axial end 12*b* of the cage annular body 12, such that liquid contacting the first deflector surface section 64A during rotation of the cage 10 in the first angular direction D1 is directed axially toward the second axial end 12*b* of the cage annular body 12. Alternatively, the second deflector surface section 64B faces partially toward the body first axial end 12*a*, such that liquid contacting the second deflector surface section 64B when the cage 10 rotates in the second angular direction D2 is directed axially toward the first axial end 12*a* of the cage annular body 12. Further, each projection rib 60 may have semicircular axial cross-sections as depicted, but may alternatively be formed with any other appropriate shape, such as rectangular, triangular, etc.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

I claim:

1. A cage for a bearing, the bearing including an inner ring, an outer ring and a plurality of rolling elements, the bearing cage comprising:

an annular body disposeable between the inner ring and the outer ring and having a centerline, first and second axial ends spaced apart along the centerline, an inner circumferential surface, an outer circumferential surface and a plurality of pockets extending radially between the inner circumferential surface and the outer circumferential surface and spaced circumferentially about the centerline, each pocket being configured to retain a separate one of the plurality of rolling elements, and a plurality of channels extending axially through the annular body and spaced circumferentially about the centerline, each channel having a first section extending from the first axial end of the annular body and connected to a separate one of the plurality of pockets and a second section extending from the connected pocket to the second axial end of the annular body, the first section of each channel circumferentially overlapping at least a portion of one pocket adjacent to the connected pocket and the second section of each channel circumferentially overlapping at least a portion of another pocket adjacent to the connected pocket and each channel being configured such that liquid entering one of the first and second sections of the channel traverses the one channel section, passes around a rolling element disposed within the one pocket fluidly connected with the one channel section, enters the other one of the first and second sections of the channel and exits the cage out of the other channel section.

2. The bearing cage as recited in claim 1 wherein the plurality of channels are each configured to pump at least a portion of a quantity of lubricant disposed within a first space adjacent to a first axial side of the bearing assembly into a second space adjacent to a second axial side of the bearing assembly when the cage rotates in a first angular direction about the centerline.

3. The bearing cage as recited in claim 2 wherein the first and second sections of each one of the plurality of channels has an open radial end at the inner circumferential surface of the annular body such that the channel is configured to entrain and direct lubricant disposed between the cage and the inner race to flow outwardly from the second axial end of the cage annular body.

4. The bearing cage as recited in claim 2 wherein each one of the plurality of channels has axial cross-sections with a semioval shape.

5. The bearing cage as recited in claim 1 wherein each one of the first and second sections of each channel is formed as an annular groove extending radially outwardly from the inner circumferential surface of the annular body.

6. The bearing cage as recited in claim 5 wherein each one of the plurality of channels extends both axially and circumferentially between a first opening at the first axial end of the annular body and a second opening at the second axial end of the annular body.

7. The bearing cage as recited in claim 6 wherein each one of the plurality of channels has a centerline extending from the first opening, through the connected pocket and to the second opening, the centerline of the groove defining an acute angle with respect to the first axial end of the cage annular body.

8. The bearing cage as recited in claim 7 wherein the acute angle has a value within the range of forty-five degrees and sixty degrees.

9. The bearing cage as recited in claim 6 wherein each one of the first and second sections of each one of the plurality of channels is bounded by an elongated curved surface extending radially outwardly from the inner circumferential surface of the cage annular body and axially between the first and second axial ends of the annular body, the curved surface having a deflector surface section facing partially toward the second axial end of the annular body such that liquid contacting the deflector surface section of the channel during rotation of the cage is directed axially toward the second opening of the channel.

10. The bearing cage as recited in claim 9 wherein the curved surface of each one of the first and second sections of each one of the plurality of channels has another deflector surface section facing the deflector surface section and facing partially toward the first axial end of the annular body such that liquid contacting the other deflector surface section of the channel during rotation of the cage in a second, opposing angular direction is directly axially toward the first opening of the channel.

11. A cage for a bearing, the bearing including an inner ring, an outer ring and a plurality of rolling elements, the bearing cage comprising:

an annular body disposeable between the inner ring and the outer ring and having a centerline, first and second axial ends spaced apart along the centerline, an inner circumferential surface, an outer circumferential surface, a plurality of pockets extending radially between the inner circumferential surface and the outer circumferential surface and spaced circumferentially about the centerline, each pocket being configured to retain a separate one of the plurality of rolling elements, and a plurality of channels extending axially through the annular body and spaced circumferentially about the centerline, each channel having a first section extending from a first opening at the first axial end of the annular body and connected to a separate one of the plurality of pockets and a second section extending from the connected pocket to a second opening at the second axial end of the annular body, the first opening being axially aligned with at least a portion of one pocket adjacent to the connected pocket and the second opening being axially aligned with at least a portion of another pocket adjacent to the connected pocket and each channel being configured such that liquid entering one of the first and second sections of the channel traverses the one channel section, passes around a rolling element disposed within the one pocket fluidly connected with the one channel section, enters the other one of the first and second sections of the channel and exits the cage out of the other channel section.

12. A cage for a bearing, the bearing including an inner ring, an outer ring and a plurality of rolling elements, the bearing cage comprising:

an annular body disposeable between the inner ring and the outer ring and having a centerline, first and second axial ends spaced apart along the centerline, an inner circumferential surface, an outer circumferential surface and a plurality of pockets extending radially between the inner circumferential surface and the outer circumferential surface and spaced circumferentially about the centerline, each pocket being configured to retain a separate one of the plurality of rolling elements, and a plurality of channels extending axially through the annular body and spaced circumferentially about the centerline, each channel having a first section extending from the first axial end of the annular body to a separate one of the plurality of pockets and a second section extending from the one pocket to the second axial end of the annular body and is configured such that liquid entering one of the first and second sections of the channel traverses the one channel section, passes around a rolling element disposed within the one pocket fluidly connected with the one channel section, enters the other one of the first and second sections of the channel and exits the cage out of the other channel section;

wherein each one of the first and second sections of each channel is formed as an annular groove extending radially outwardly from the inner circumferential surface of the annular body, each one of the plurality of channels extending both axially and circumferentially between a first opening at the first axial end of the annular body and a second opening at the second axial end of the annular body, and each one of the first and second sections of each one of the plurality of channels is bounded by an elongated curved surface extending radially outwardly from the inner circumferential surface of the cage annular body and axially between the first and second axial ends of the annular body, the curved surface having a deflector surface section facing partially toward the second axial end of the annular body such that liquid contacting the deflector surface section of the channel during rotation of the cage is directed axially toward the second opening of the channel.

* * * * *